(12) United States Patent
Combrie et al.

(10) Patent No.: US 8,019,186 B2
(45) Date of Patent: Sep. 13, 2011

(54) PHOTONIC CRYSTAL CIRCUIT COMPRISING A GUIDED MODE ADAPTER AND OPTICAL SYSTEM INCLUDING SAID CIRCUIT COUPLED WITH AN OPTICAL FIBER

(75) Inventors: Sylvain Combrie, Paris (FR); Nguyen Vy Quynh Tran, Dong Nai (VN); Alfredo De Rossi, Paris (FR)

(73) Assignee: Thales, Neuilly Sur Seine (FR)

( * ) Notice: Subject to any disclaimer, the term of this patent is extended or adjusted under 35 U.S.C. 154(b) by 215 days.

(21) Appl. No.: 12/499,727

(22) Filed: Jul. 8, 2009

(65) Prior Publication Data

US 2010/0272387 A1  Oct. 28, 2010

(30) Foreign Application Priority Data

Jul. 11, 2008  (FR) ...................... 08 03987

(51) Int. Cl.
  *G02B 6/12* (2006.01)
  *H01L 21/00* (2006.01)
  *C23F 1/00* (2006.01)
(52) U.S. Cl. .............. 385/14; 385/28; 385/34; 385/129; 385/130; 385/141; 385/122; 438/31; 438/33; 438/37; 216/2
(58) Field of Classification Search .................. 385/122, 385/129, 130, 131, 132, 141, 14, 24, 27, 385/28, 29, 43, 31, 33, 34; 438/31, 33, 37; 216/2
See application file for complete search history.

(56) References Cited

U.S. PATENT DOCUMENTS

| | | | |
|---|---|---|---|
| 6,711,200 B1* | 3/2004 | Scherer et al. | 372/64 |
| 7,157,296 B2* | 1/2007 | Murakowski et al. | 438/31 |
| 7,206,488 B1* | 4/2007 | Altug et al. | 385/131 |
| 7,289,221 B2* | 10/2007 | Wang et al. | 356/477 |
| 7,928,386 B2* | 4/2011 | Frey et al. | 250/336.2 |
| 2004/0076361 A1* | 4/2004 | Wong et al. | 385/14 |
| 2004/0214361 A1* | 10/2004 | Murakowski et al. | 438/31 |
| 2006/0039649 A1 | 2/2006 | Gomyo et al. | 250/336.2 |
| 2008/0089640 A1 | 4/2008 | Beausoleil | 385/24 |
| 2010/0272387 A1* | 10/2010 | Combrie et al. | 385/14 |

OTHER PUBLICATIONS

Hideo Kosaka, et al., "Photonic-crystal spot-size converter", Applied Physics Letters, Jan. 17, 2000, pp. 268-270, vol. 76, No. 3, Melville, NY.
N Ikeda, et al., "Coupling characteristic of micro planar lens for 2D photonic crystal waveguides", Indium Phosphide & Related Materials, May 1, 2007, pp. 484-486.

(Continued)

*Primary Examiner* — Brian M Healy
(74) *Attorney, Agent, or Firm* — LaRiviere, Grubman & Payne, LLP

(57) ABSTRACT

The invention relates to a photonic crystal circuit comprising a guide produced in a photonic crystal membrane on the surface of a substrate and a mode adapter coupled to said guide, wherein the membrane includes a central point constituting the mode adapter having a section gradient as termination of said guide, said point being suspended so as to allow the propagation of modes in a symmetrical manner. It also relates to an optical system incorporating said circuit coupled to an optical fiber.

10 Claims, 9 Drawing Sheets

OTHER PUBLICATIONS

M Lipson, "Contrilling light on a microelectronics' chip: solving the coupling, modulation and switching challenges", Group IV Photonics, Sep. 29, 2004, pp. 16-18, Piscataway, NJ.

W Bogaerts, et al., "Basic structures for photonic integrated circuits in silicon-on-insulator", Optics Express OPT, Apr. 19, 2004, vol. 12, No. 8, USA.

Mekis Attila, et al., "Tapered couplers for efficient interfacing between dielectric and photonic crystal waveguides", Journal of Lightwave Technology, Jun. 1, 2001, vol. 19.

D J Blumenthal, et al., "Transmission measurement of tapered single-line defect photonic crystal waveguides", IEEE Photonics Technology Letters, Oct. 1, 2005, pp. 2092-2094.

* cited by examiner

PHOTONIC CRYSTAL CIRCUIT COMPRISING A GUIDED MODE ADAPTER AND OPTICAL SYSTEM INCLUDING SAID CIRCUIT COUPLED WITH AN OPTICAL FIBER

PRIORITY CLAIM

This application claims priority to French Patent Application Number 08 03987, entitled Photonic Crystal Circuit Comprising a Guided Mode Adapter and Optical System including Said Circuit Coupled with an Optical Fiber, filed on Jul. 11, 2008.

FIELD OF THE INVENTION

The field of the invention is that of photonic crystal circuits that add original functions in the photonics field: all-optical signal processing, optical sampling, delay line, filtering, chemical sensor, single photon source.

BACKGROUND OF THE INVENTION

These are optical devices of very small size and very low consumption, particularly sought-after for applications in the field of quantum communications (cryptography, computation, etc.) or for so-called "extreme" integration.

Generally, the photonic crystals are structures with a dielectric index that varies periodically in line with the wavelength, in one or more directions in space. FIG. 1 illustrates the intensity of the electrical field of an electromagnetic wave being propagated in this type of structure and shows the dispersion pattern of a structure of period a in the first Brillouin area; the wave vector k lies within the interval $0<k<\pi/a$. It is known how to artificially structure materials, for example semiconductors, to exploit the diffraction effects and by the same token making it possible to create passive and active optical functions necessary, for example, for optical fiber-based telecommunication networks.

Moreover, one of the major attractions of these structures lies in the controlled insertion of defects within the crystal. These defects can generate states at the prohibited band frequencies of the crystal and thus enable an electromagnetic field that can propagate these frequencies. Control of the propagation of light within the crystal and in step with the wavelength can then be envisaged via these defects. The use of these structures thus opens the way to the miniaturization of integrated optical components.

Compared to the three-dimensional crystalline structures, it has been shown that a two-dimensional structure could be particularly interesting. In this case, crystals are produced in a thin semiconductive guiding layer which provides for better control and a technology that is easier to implement and that is compatible with conventional microelectronics technologies.

A very thin layer is isolated, thus constituting a membrane that can typically have a thickness h of the order of 150 nanometers to 300 nanometers for the applications targeted on the spectral domain between approximately 1 micron and 1.6 microns. By a simple scale law, this thickness is adjusted to extend the application to other spectral domains. The law is as follows: h is between 0.1 and 0.3 times the wavelength. The material used can typically be silicon or a semiconductor material based on elements from columns III and V of Mendeleyev's Periodic Table (semiconductors "III-V", for example GaAs, AlGaAs, GaInP, InP, AlGaAsP, etc.).

Materials that can also be envisaged are semiconductors from the family II-VI (for example ZnO) as well as SiN.

A waveguide is created within these membranes that has a strong optical index variation as illustrated in FIG. 2. It is notably possible to adjust the speed of propagation of the waves and the dispersion of the guided modes by varying the size of the patterns.

In addition, these devices are extremely compact and can be easily integrated. This means a low consumption, and a very reduced weight and volume, which makes them very attractive for embedded applications. However, the connection with a fiber is a difficult point and there is no current simple and inexpensive solution with which to address this major problem.

In practice, an adaptation must be made between the guided mode of an optical fiber, the size of which is typically of the order of a few hundreds of microns squared (typically of the order of 10 µm in diameter), and that of a waveguide produced within a photonic crystal that is capable of containing modes in sections of approximately $0.2*0.3$ $\mu m^2$.

Notably proposed by IBM researchers Sharee J. McNab, Nikolaj Moll and Yurii A. Vlasov, in "Ultra-low loss photonic integrated circuit with membrane-type photonic crystal waveguides", OPTICS EXPRESS 2927, 3 Nov. 2003/vol. 11, No. 22, is a technology defining an element adjacent to the photonic crystal and of variable section.

This element made of silicon Si is produced on the surface of a layer of oxide $SiO_2$ and embedded in a polymer referenced Poly. It is thus possible to use it as an adapter. FIGS. 3a and 3b illustrate this adaptive element and FIG. 4 represents the solution recommended in this article which consists in making an adaptation in three stages between the guided modes of the fibers F and those derived from the photonic crystal PhC.

According to this technology, a first element $A_1$ couples the mode of the photonic crystal to that of a suspended ribbon guide. A transition is then made to a ribbon guide resting on the low-index sacrificial layer. Finally, a last element $A_2$ adapts the optical mode of the latter to that of the optical fiber F.

The drawbacks of such a solution lie notably in:
the complexity of design (two mode adapters),
the complexity of production (addition or a plurality of technological steps and inclusion of an additional material: polymer),
the spurious reflections that can occur at the transition between the suspended ribbon and the ribbon resting on the dielectric (in particular, if the latter is not low index),
the spurious reflections on the substrate that can occur and are due to the divergence, however weak, of the beam,
the cleaving accuracy needed to avoid the above reflections,
the proximity effects during the electronic lithography provoked by the change of geometry.

Moreover, this solution can be produced on an $SiO_2$ substrate, but is difficult to apply to other materials because the portion of the guide in ribbon form must be maintained by a low-index substrate.

The adaptive element on the surface of the layer of $SiO_2$ is then in a heterogeneous environment. It rests on a substrate whereas its top surface is not in contact with the same type of material. This property creates a dissymmetry at the level of the containment of the optical modes.

Also proposed by a Japanese university team—N. Ikeda, H. Kawashima, Y. Sugimoto, T. Hasama, K. Asakawa, H. Ishikawa, in "Coupling characteristic of micro planar lens for 2D photonic crystal waveguides", Conference Proceedings of IPRM (International Conference on Indium Phosphide and Related Materials) May 2007, is a technology defining a planar lens placed at the termination of a waveguide made of photonic crystal. This element, produced in GaAlAs, is used to reduce the coupling losses and the alignment tolerances while reducing the spurious Fabry-Perot reflections. The main problem with this solution lies in the fact that the radiated beam is not circulated because of the geometrical factors of the microlens; this techniques does not make it possible to reduce the divergence in the vertical plane.

SUMMARY OF THE INVENTION

To resolve this type of problem, the present invention proposes a mode adapter that transforms the mode of the photonic crystal into a propagative mode in free space of Gaussian type with a numerical aperture such that it allows for an effective coupling with an optical fiber via a standard suitable optic (microlens, lensed fiber, GRIN lens, microsphere).

Specifically, the subject of the invention is a photonic crystal circuit comprising a guide produced in a membrane made of dielectric material and a mode adapter coupled to said guide, wherein the membrane includes a central point constituting the mode adapter having a section gradient as termination of said guide, said point being suspended so as to allow the propagation of modes in a symmetrical manner.

According to a variant, the point extends beyond the cleaving plane of the substrate in order to avoid the spurious reflections on the latter.

According to a variant of the invention, the membrane is made of silicon.

According to a variant of the invention, the membrane is made of type III-V material such as GaAs, GaAlAs, GaInP, InP, GaInAsP.

According to a variant of the invention, the thickness of the membrane is between approximately 100 nanometers and 300 nanometers for applications in the 900 nm to 1600 nm domain.

According to a variant of the invention, the photonic crystal comprises patterns having a periodicity of the order of a few hundred nanometers.

According to a variant of the invention, the patterns of the photonic crystal are holes having radii of the order of 120 to 130 nanometers depending on the targeted operating wavelength.

Another subject of the invention is a method of manufacturing a photonic crystal circuit according to the invention, which comprises the following steps:

the production of a groove on the surface of the membrane concurrent with the definition of the photonic crystal;
an operation for chemically etching the sacrificial layer, undercutting both the coupling point and the photonic crystal structures;
a cleaving operation for releasing the point constituting the adapter from the groove produced previously.

According to a variant of the invention, the operation for producing a groove is carried out over a width of the order of a hundred or so nanometers.

Another subject of the invention is an optical system comprising a photonic crystal circuit according to the invention, an adaptive optic and an optical fiber.

According to a variant of the invention, the adaptive optic is of GRIN (graded index)-type microlens or lens type.

BRIEF DESCRIPTION OF THE DRAWINGS

The invention will be better understood and other advantages will become apparent from reading the description that follows, given by way of nonlimiting example and from the appended figures in which:

FIGS. 8b and 8c illustrate the radiation patterns in the sagittal plane and in the azimuthal plane for the structures represented in FIGS. 6a and 6b within the frame of reference with polar coordinates illustrated in FIG. 8a;

DETAILED DESCRIPTION OF THE INVENTION

According to the invention, there is proposed a photonic crystal circuit capable of being coupled with a standard optical fiber and which minimizes the losses on the transmission of photons from the optical crystal into the fiber.

Figure 1:
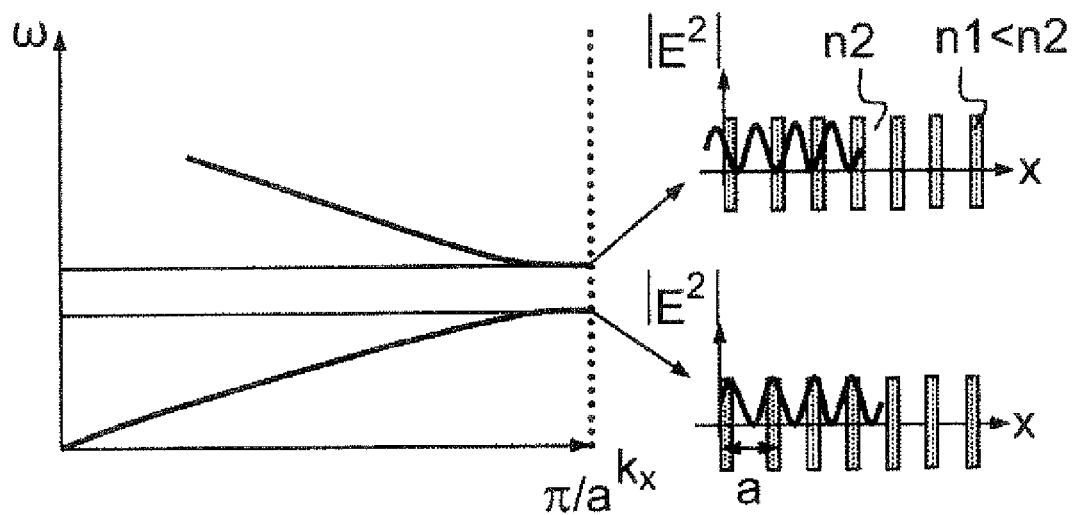
FIG. 1 illustrates the intensity of the electrical field of an electromagnetic wave being propagated in this type of structure and shows the dispersion pattern of a structure of period a in the first Brillouin area for which the wave vector k lies within the interval $0<k<\pi/a$.
Figure 2:
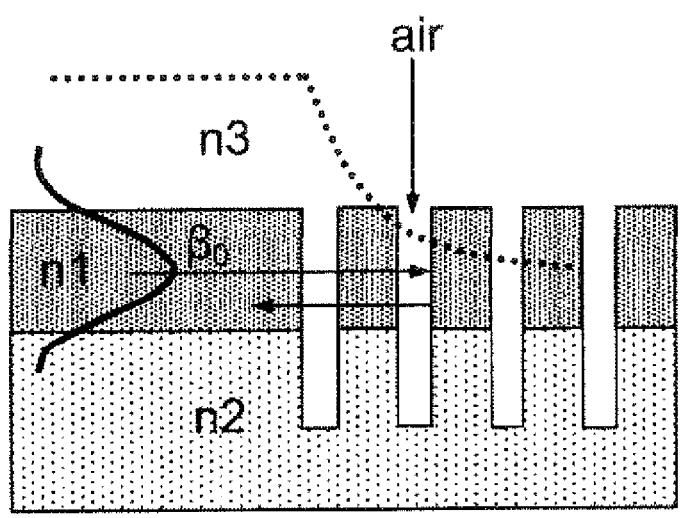
FIG. 2 illustrates a two-dimensional photonic crystal structure comprising a waveguide.
Figure 3A:
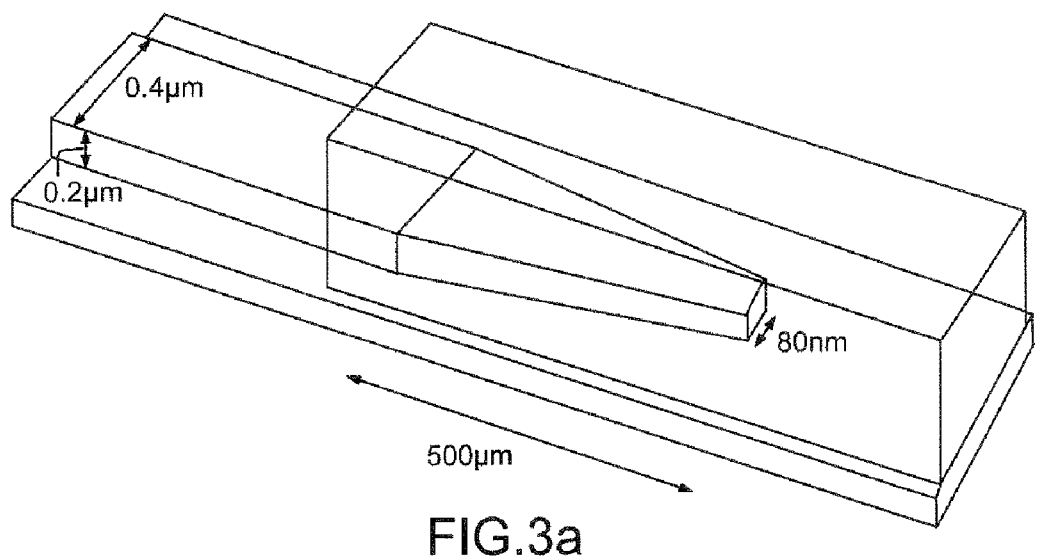
FIGS. 3a and 3b illustrate perspective views of a mode adapter element according to the prior art and in contact with a substrate.
Figure 3B:
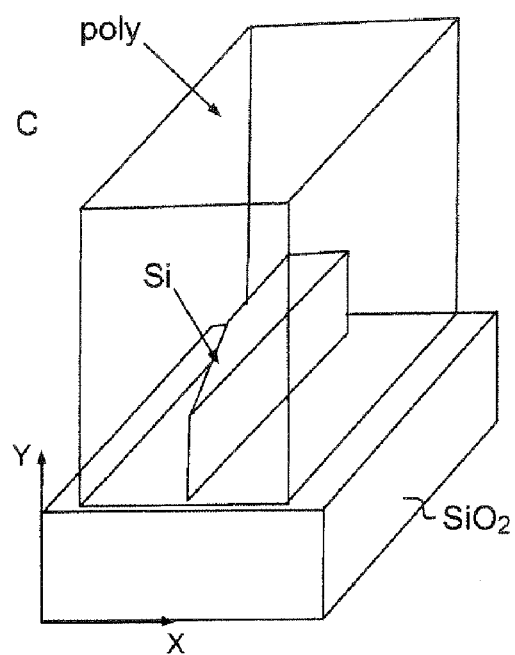
Figure 4:
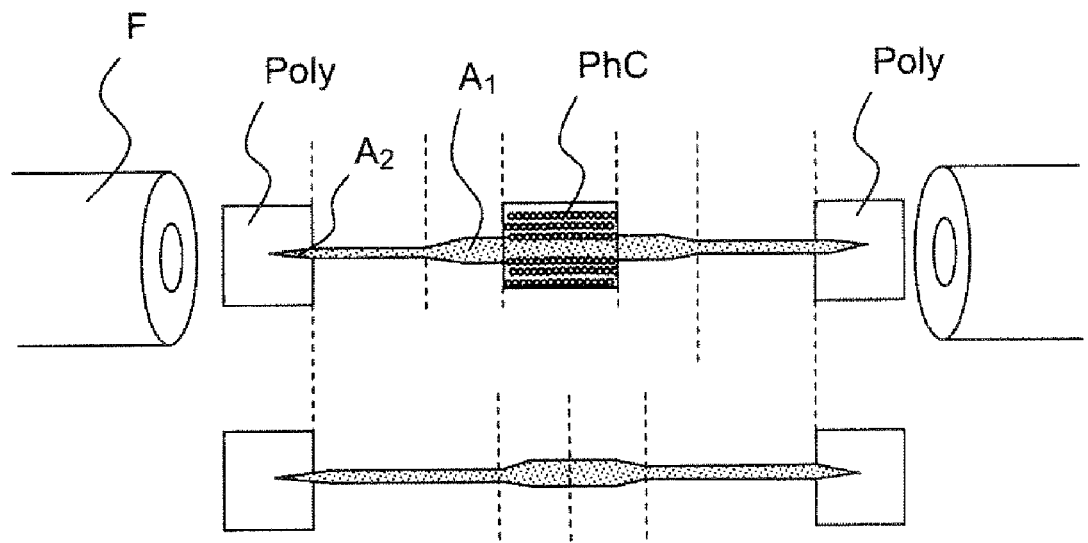
FIG. 4 illustrates an exemplary optical system incorporating adapters like those illustrated in FIGS. 3a and 3b.
Figure 5:
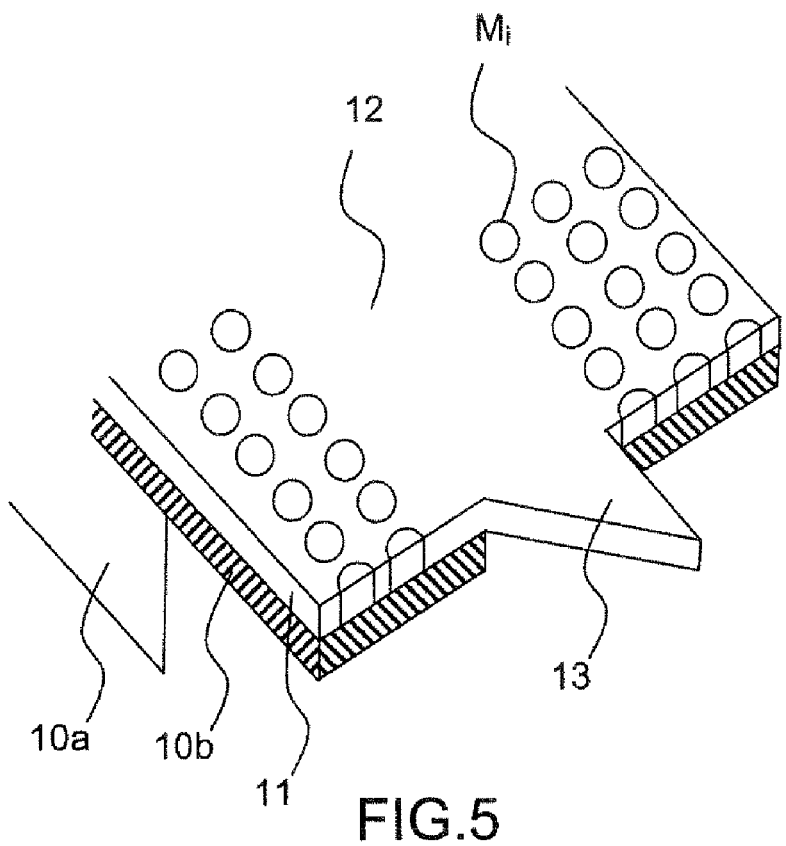
FIG. 5 illustrates an exemplary photonic crystal circuit according to the invention.

This circuit comprises, as illustrated in FIG. 5, a membrane 11 formed by a thin layer of semiconductive material into which are introduced periodic patterns that can typically be holes. A guide 12 is produced at the level of this membrane and embodied by an absence of periodic patterns. This membrane is created on the surface of a substrate 10a which can advantageously comprise a so-called sacrificial layer 10b on which are produced the periodic patterns Mi in the form of holes produced within the membrane 11.

According to the invention, the photon guide is prolonged by an adaptive element 13 having a section gradient without period patterns so as to create a mode adaptation at the guide output.

An additional advantage of the photonic crystal circuit of the present invention lies in the strong reduction of the spurious reflections on the input/output facets, which eliminates the need for specific anti-glare processing operations that are required with an abrupt break in the output face of a photonic crystal circuit of the known art.

Figure 6A:
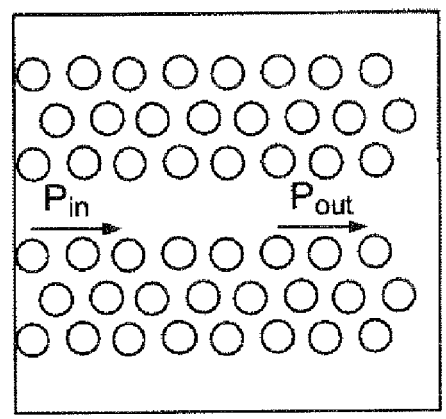
FIGS. 6a and 6b illustrate exemplary photonic crystal guide structures respectively without point and with double point.
Figure 6B:
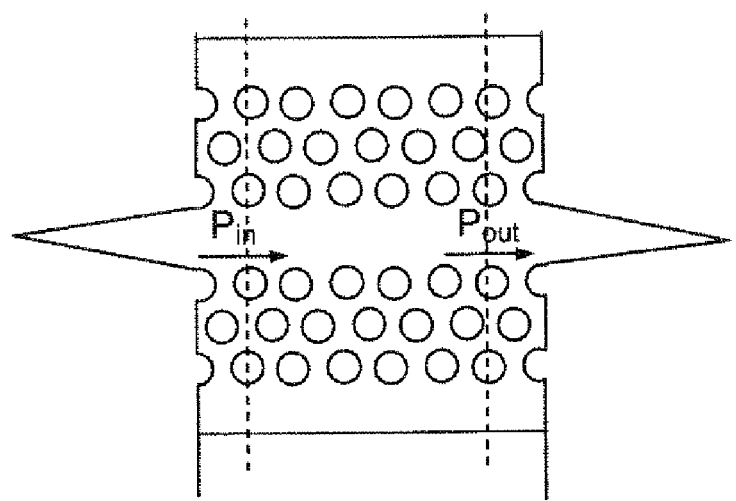
Figure 7:
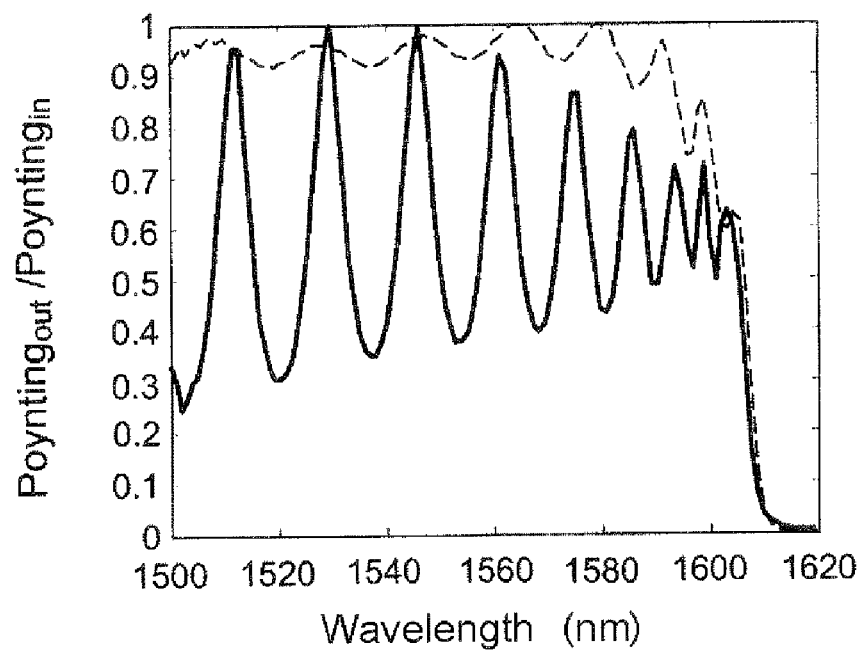
FIG. 7 illustrates the standardized transmission of a guide section for the structures represented in FIGS. 6a and 6b.

Studies have made it possible to compare the standardized transmission of a photonic crystal guide section with and without coupler and reveal the suppression of spurious reflections on the terminations. By way of example, the structures of FIGS. 6a and 6b have been evaluated in terms of transmission represented in FIG. 7.

Figure 8A:
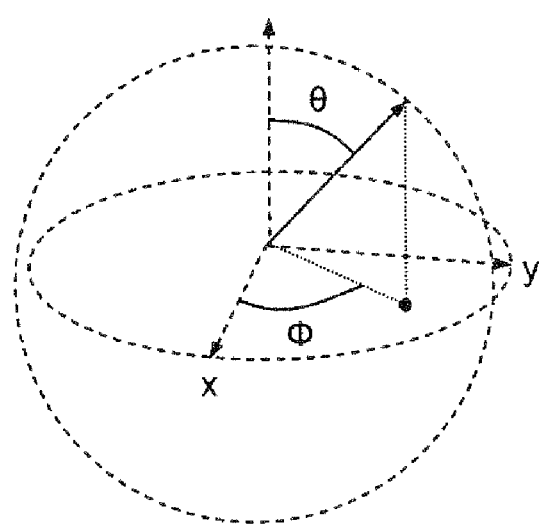
Figure 8B:
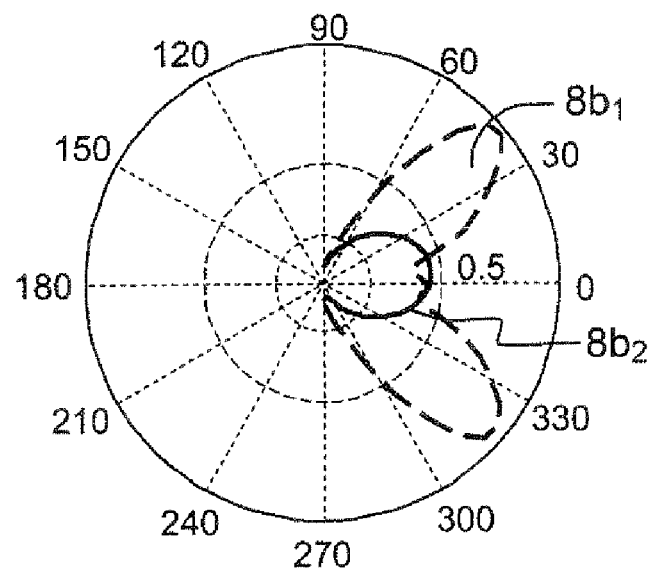
Figure 8C:
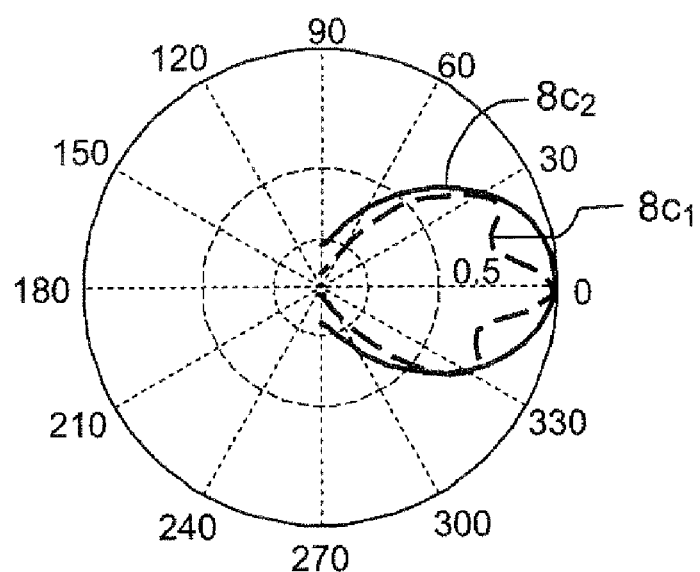

The radiation patterns of these structures are illustrated in FIGS. 8b and 8c and show a better directivity with adaptive element. The broken line curves $8b_1$ and $8c_1$ relate to the sagittal plane, the bold line curves $8b_2$ and $8c_2$ relate to the azimuthal plane in the frame of reference of polar coordinates illustrated in FIG. 8a.

The appearance of a quasi-circular mode reflects the improvement of the coupling in the case of the structure with point handling the adaptation function.

One of the major benefits of the present invention lies also in the simplicity with which the guide termination point is created, which can be produced at the same time as the technological steps other than those of production of the photonic crystal circuit.

Figure 9A:
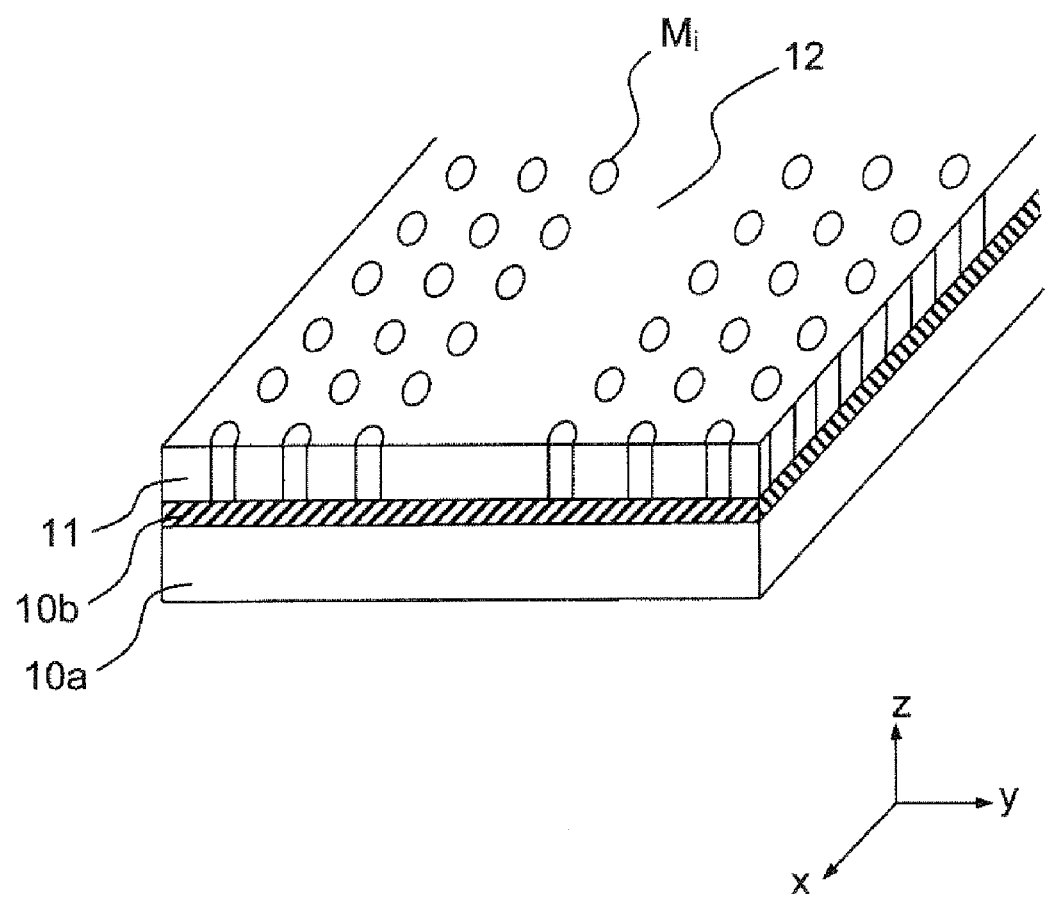
FIGS. 9a to 9c illustrate the various steps of an exemplary method of manufacturing a photonic crystal circuit according to the invention.
Figure 9B:
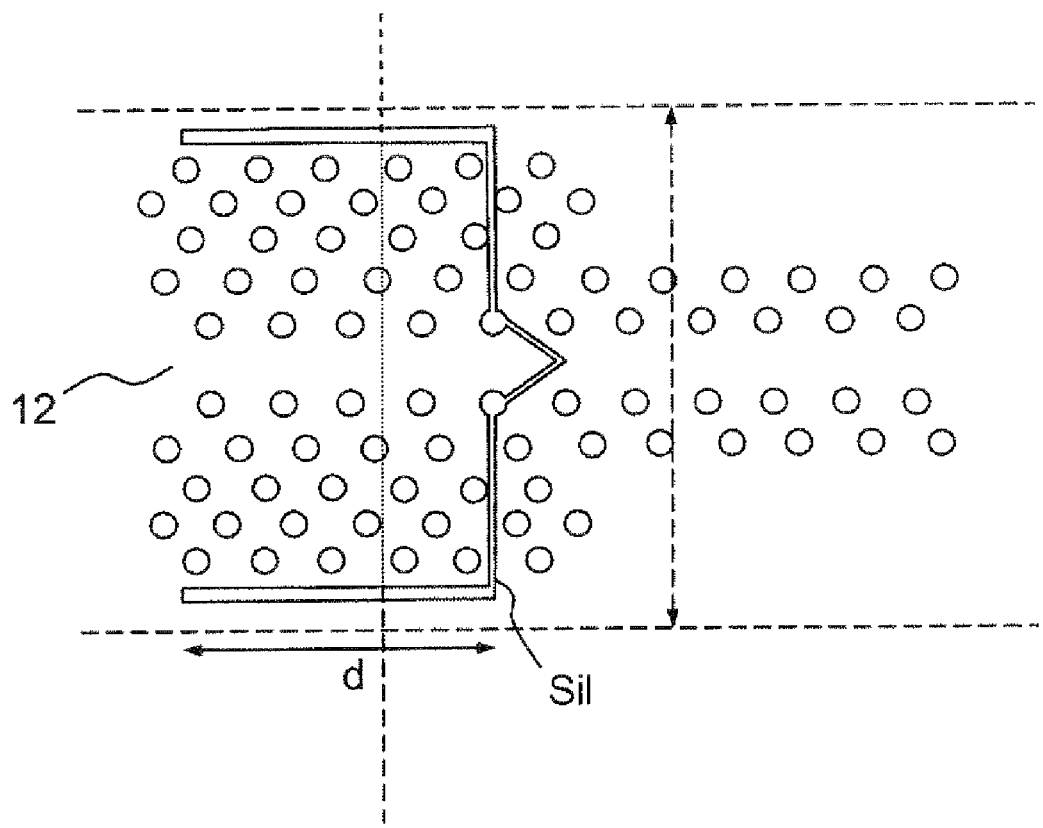
Figure 9C:
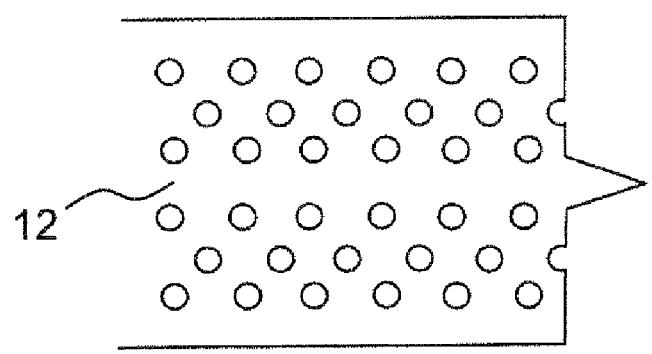

We will now describe an exemplary photonic crystal circuit according to the invention and notably with the help of FIGS. 9a to 9c.

A stack is produced on the surface of a substrate 10a comprising a sacrificial layer 10b and a layer of semiconductive material 11 handling the membrane function, in which locally periodic holes Mi are produced, while retaining a pattern-free area dedicated to the guide 12 as illustrated in FIG. 9a.

According to a variant illustrated in FIG. 9b, a groove Sil can be produced at the same time as the holes, said groove typically being able to have a width of approximately 100 nm, the distance d represented in FIG. 9b possibly typically being of the order of 10 µm to 40 µm; this value can be reduced according to the cleaving tolerances and the alignment accuracy of the patterns relative to the crystalline plane of the semiconductor.

A chemical etching operation is then carried out on the sacrificial layer, with which to release the bottom part of the point, thus making it possible to define the suspended adaptive element which thus exhibits a perfect symmetry between its bottom and top faces.

A cleaving step is then carried out to isolate the point at the guide edge as illustrated in FIG. 9c.

The newly created photonic crystal circuit can advantageously be incorporated in an optical system. The point of said circuit is coupled to an optical fiber, one end of which can advantageously be provided with a lens that can typically have a focal distance of the order of 10 to 20 µm.

Figure 10:
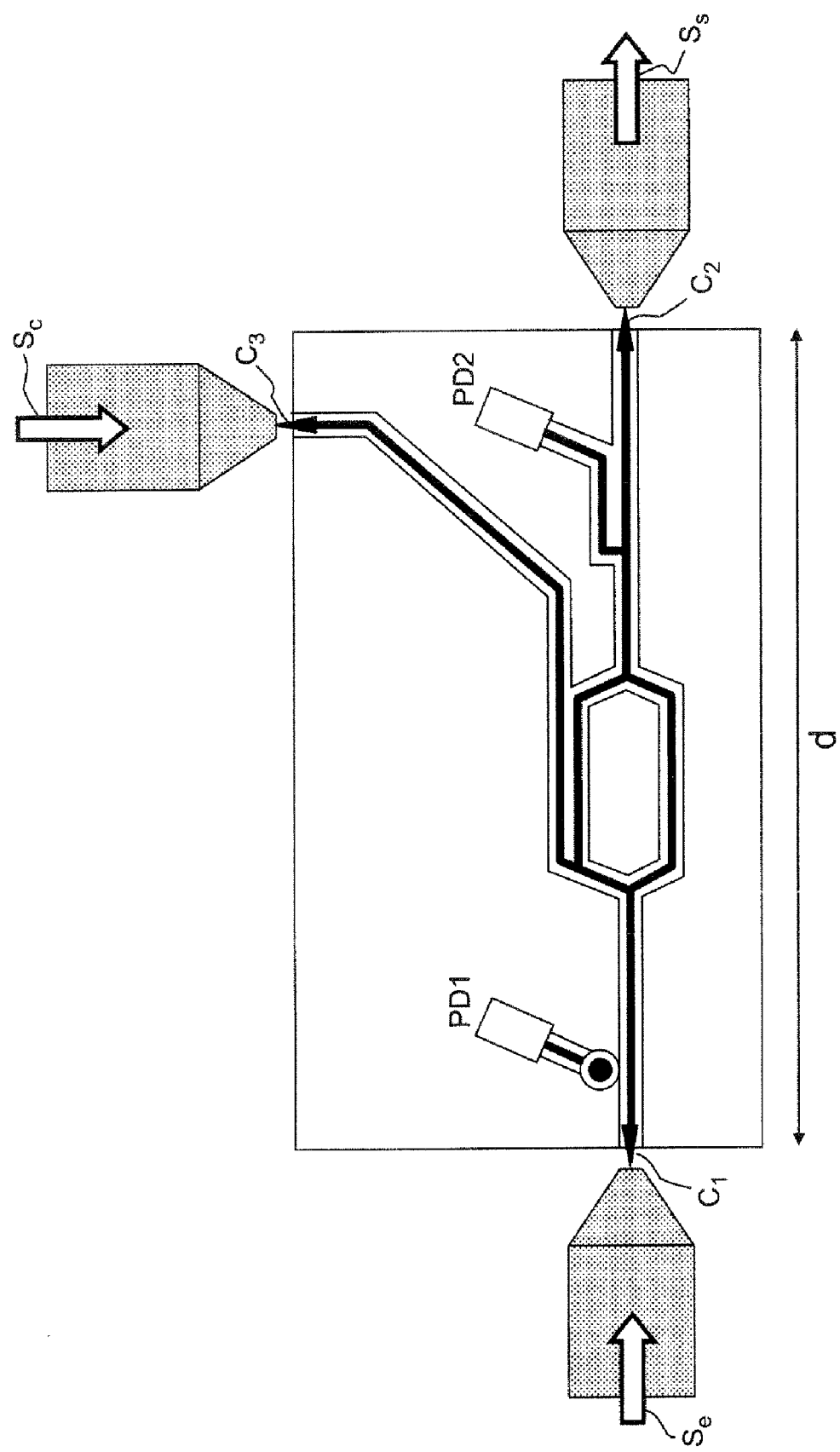
FIG. 10 illustrates a complex photonic crystal circuit with inputs/outputs based on the present invention.

FIG. 10 illustrates an exemplary application in which the photonic crystal equipped with its adaptive part handles the coupler function, which is particularly interesting.

It is a complex photonic crystal circuit with inputs/outputs based on the present invention. From a carrier or input signal emitting a signal of wavelength λs, it is possible to make said signal wave interfere with a control optical wave at the wavelength λc to address an optical signal information packet and generate an output optical signal Ss.

Thus, photonic crystals and their adaptive point, named couplers $C_1$, $C_2$ and $C_3$, can be used to couple input signals Se and control signals Sc to guides arranged so as to produce an interferometer architecture. The guides are produced within photonic crystals of membrane type, by modifying the periodic structure, typically produced by the absence of patterns.

The device also comprises photodetectors PD1 and PD2, for selecting signals resulting from the interferences of the input and control signals and making it possible to sample the information carrying signal.

Typically, all the bulk of such a device can be extremely compact, the dimension d possibly being of the order of a few millimeters.

The invention claimed is:

1. A photonic crystal circuit comprising a guide (12) produced in a photonic crystal membrane (11) on the surface of a substrate (10a) and a mode adapter (13) coupled to said guide, wherein the membrane includes a central point constituting the mode adapter having a section gradient as termination of said guide, said point being suspended so as to allow the propagation of modes in a symmetrical manner.

2. The photonic crystal circuit as claimed in claim 1, wherein the membrane is made of silicon.

3. The photonic crystal circuit as claimed in claim 1, wherein the membrane is made of type III-V material such as GaAs, GaAlAs, GaInP, or InP, GaInAsP.

4. The photonic crystal circuit as claimed in one of claims 1 to 2, wherein the thickness of the membrane is between approximately 100 nanometers and 300 nanometers.

5. The photonic crystal circuit as claimed in one of claims 1 to 2, wherein the photonic crystal comprises patterns having a periodicity of the order of a few hundred nanometers.

6. The photonic crystal circuit as claimed in one of claims 1 to 2, wherein the patterns of the photonic crystal are holes having radii of the order of 120 to 130 nanometers.

7. A method of manufacturing a photonic crystal circuit as claimed in one of claims 1 to 2, which comprises the following steps:
   the production of a groove on the surface of the membrane;
   an operation for etching the sacrificial layer (10b);
   a cleaving operation for releasing the point constituting the adapter from the groove produced previously.

8. The method of manufacturing a photonic circuit as claimed in claim 7, wherein the operation for producing a groove is carried out over a width of the order of a hundred or so nanometers.

9. An optical system comprising a photonic circuit as claimed in one of claims 1 to 2, an adaptive optic and an optical fiber.

10. The optical system as claimed in claim 9, wherein the adaptive optic is of GRIN-type microlens or lens type.

* * * * *